US008964270B2

(12) United States Patent
Suzuki (10) Patent No.: US 8,964,270 B2
(45) Date of Patent: Feb. 24, 2015

(54) IMAGE READING APPARATUS (71) Applicant: Hirofumi Suzuki, Kiyosu (JP)

(72) Inventor: Hirofumi Suzuki, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/229,477

(22) Filed: Mar. 28, 2014

(65) Prior Publication Data
US 2014/0300939 A1 Oct. 9, 2014

(30) Foreign Application Priority Data

Mar. 29, 2013 (JP) .................................. 2013-070837
Mar. 29, 2013 (JP) .................................. 2013-070846

(51) Int. Cl.
*H04N 1/04* (2006.01)
*H04N 1/00* (2006.01)
(52) U.S. Cl.
CPC ....... *H04N 1/00729* (2013.01); *H04N 1/00588* (2013.01); *H04N 1/00594* (2013.01); *H04N 1/00615* (2013.01); *H04N 1/00602* (2013.01)
USPC ............ 358/498; 358/474; 358/497; 358/501

(58) Field of Classification Search
USPC .................................. 358/498, 474, 497, 501
See application file for complete search history.

(56) References Cited

U.S. PATENT DOCUMENTS

| 8,395,826 B2* | 3/2013 | Tan ................................ 358/474 |
| 2005/0127160 A1* | 6/2005 | Fujikawa ...................... 235/379 |
| 2008/0285097 A1 | 11/2008 | Kitagawa et al. |
| 2012/0105925 A1 | 5/2012 | Shirai et al. |

FOREIGN PATENT DOCUMENTS

| JP | 2008-285259 A | 11/2008 |
| JP | 2012-100115 A | 5/2012 |

* cited by examiner

*Primary Examiner* — Houshang Safaipour
(74) *Attorney, Agent, or Firm* — Banner & Witcoff, Ltd.

(57) ABSTRACT

An image reading apparatus may include multiple detection portions including a first detection portion and a second detection portion. The first detection portion and the second detection portion may be configured to distinguishably detect the insertion of media from one of a first opening and a second opening. In one example, the first detection portion may be disposed along a first conveyance path corresponding to the first opening while the second detection portion may be disposed along a second conveyance path corresponding to the second opening.

19 Claims, 7 Drawing Sheets

IMAGE READING APPARATUS

CROSS-REFERENCE TO RELATED APPLICATION

This application claims priority from Japanese Patent Application Nos. 2013-070837 and 2013-070846 both filed on Mar. 29, 2013, the contents of which are incorporated herein by reference in their entireties.

FIELD

Aspects described herein relate to an image reading apparatus.

BACKGROUND

A known image reading apparatus includes a housing, a first guide portion, a second guide portion, and a reader. The housing includes a first introduction opening, a second introduction opening, and a discharge opening. A medium is inserted into the first introduction opening. The length of the second introduction opening is shorter than that of the first introduction opening. A medium having a width smaller than that of the medium to be inserted into the first introduction opening is inserted into the second introduction opening. The mediums inserted from the first introduction opening and the second introduction opening are both discharged from the discharge opening. The first guide portion includes a first conveyance path through which the medium inserted from the first introduction opening is guided toward the discharge opening. The second guide portion includes a second conveyance path through which the medium inserted from the second introduction opening is guided to join the first guide portion. The reader is disposed on a discharge opening side with respect to a junction where the second guide portion joins the first guide portion. The reader is configured to read an image on the medium guided by the first guide portion and the second guide portion.

In the image reading apparatus, the first guide portion and the second guide portion are provided such that the second conveyance path continues generally straightly to a portion of the first conveyance path on the discharge opening side with respect to the junction. With such a structure, various mediums, such as plastic cards, that are relatively thick and inflexible, may be conveyed favorably while being guided by the first guide portion and the second guide portion.

BRIEF SUMMARY

An image reading apparatus generally includes a sensor configured to detect the medium being conveyed. However, such an image reading apparatus does not distinguish between media inserted through the first opening versus the second opening.

An aspect of the disclosure relates to an image reading apparatus configured to distinguishably detect a medium inserted through a first introduction opening and a medium inserted through a second introduction opening.

According to one aspect of the present disclosure, an image reading apparatus may comprise a housing, a reader, a first detection portion, and a second detection portion. The housing has a first introduction opening, a second introduction opening, and a discharge opening. The first detection portion may be configured to detect media inserted through the first introduction opening while the second detection portion may be configured to detect media inserted through the second introduction opening.

BRIEF DESCRIPTION OF THE DRAWINGS

For a more complete understanding of the disclosure, needs satisfied thereby, and the objects, features, and advantages thereof, reference now is made to the following descriptions taken in connection with the accompanying drawing.

DETAILED DESCRIPTION

An example embodiment is described in detail herein with reference to the accompanying drawings, like reference numerals being used for like corresponding parts in the various drawings.

Figure 1:
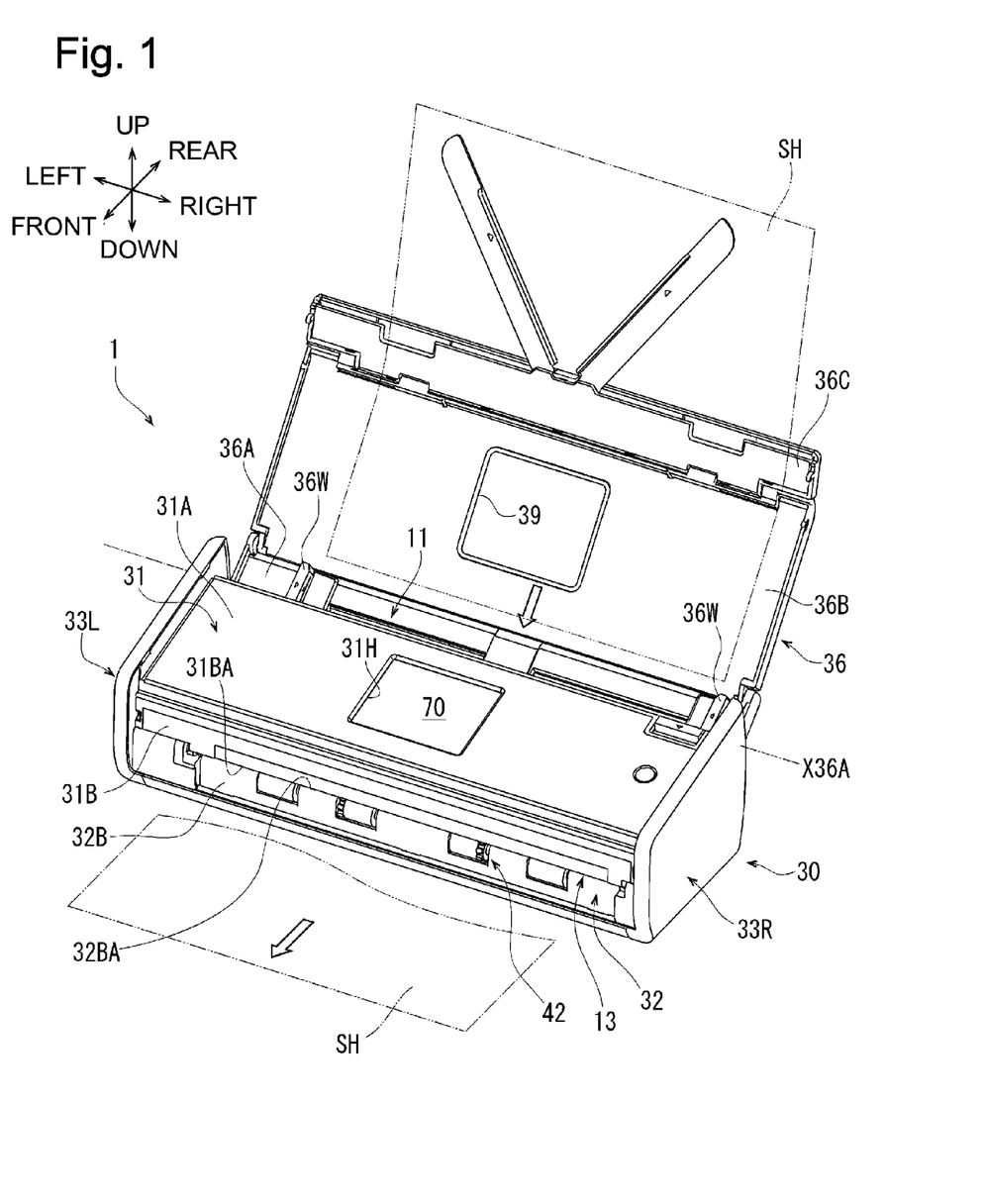
FIG. 1 is a front perspective view of an image reading apparatus, in an example embodiment according to one or more aspects of the disclosure, in which a sheet tray is open.

In FIG. 1, a side of an image reading apparatus 1 on which a discharge opening 13 is disposed may be defined as the front side of the image reading apparatus 1. A side of the image reading apparatus 1 that is placed on the left when viewed from the side facing the discharge opening 13 may be defined as the left side of the image reading apparatus 1. To facilitate understanding of the orientation and relationship of the various elements disclosed herein, the front, rear, left, right, up, and down of the image reading apparatus 1 may be determined with reference to axes of the three-dimensional Cartesian coordinate system included in each of the relevant drawings.

As depicted in FIGS. 1-8, the image reading apparatus 1 may comprise a housing 30 and a sheet tray 36. The housing 30 may comprise a first chute member 31, a second chute member 32, and a pair of left and right side frames 33L and 33R that may be combined. Left and right side frames 33L and 33R may be spaced apart in the left and right direction. The upper end of each of the left and right side frames 33L and 33R may be connected to each of the left and right ends of the first chute member 31, respectively. The lower end of each of the left and right side frames 33L and 33R may be connected to each of the left and right ends of the second chute member 32, respectively.

The first chute member 31 disposed on the upper side of the image reading apparatus 1 and the second chute member 32 disposed on the lower side of the image reading apparatus 1 may oppose one another in a vertical direction, e.g., an up-down direction, with a distance therebetween. The first chute member 31 and the second chute member 32 may be interposed between the left and right side frames 33L and 33R.

Figure 5:
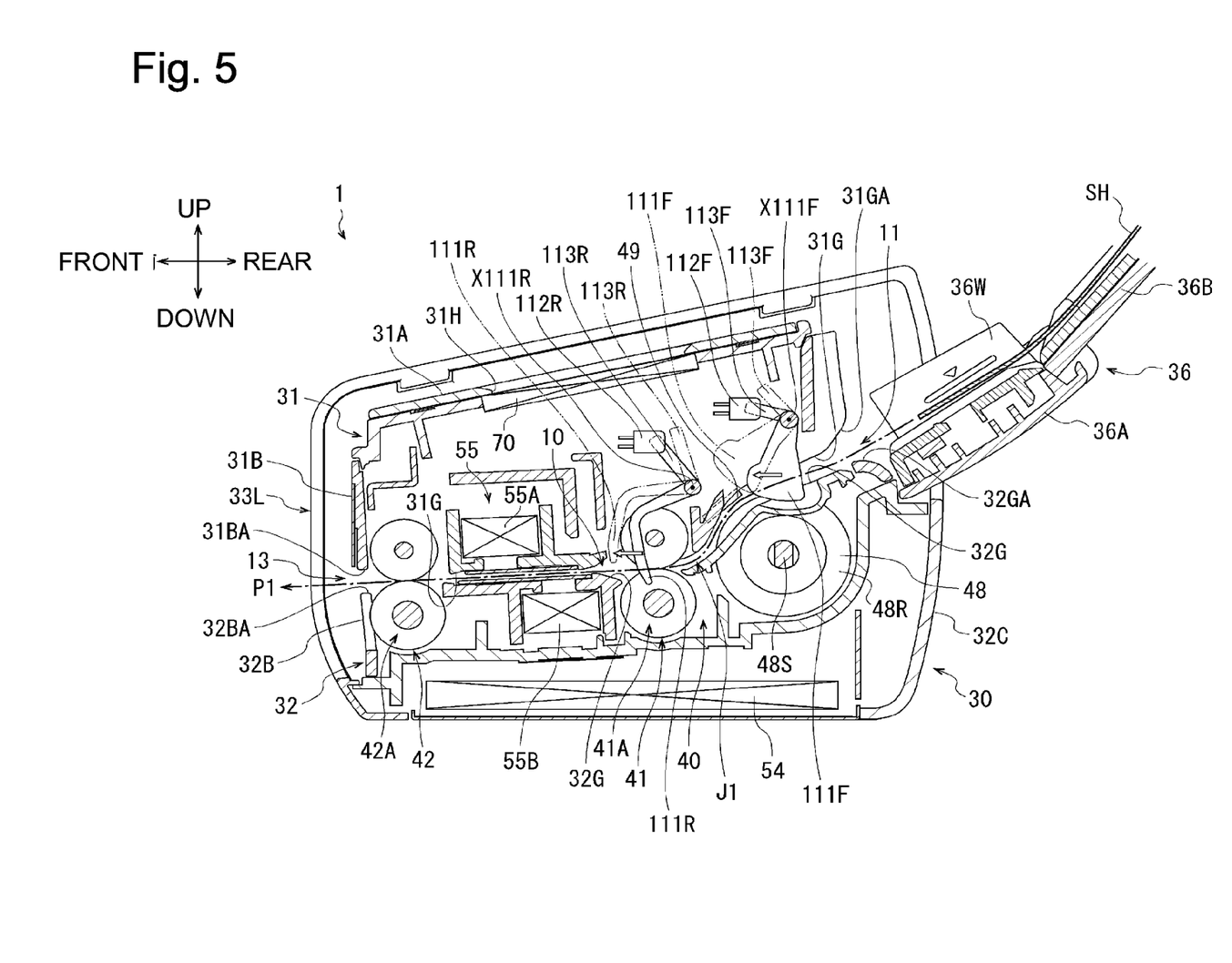
FIG. 5 is a sectional view of the image reading apparatus, taken along the line A-A in FIG. 4.
Figure 6:
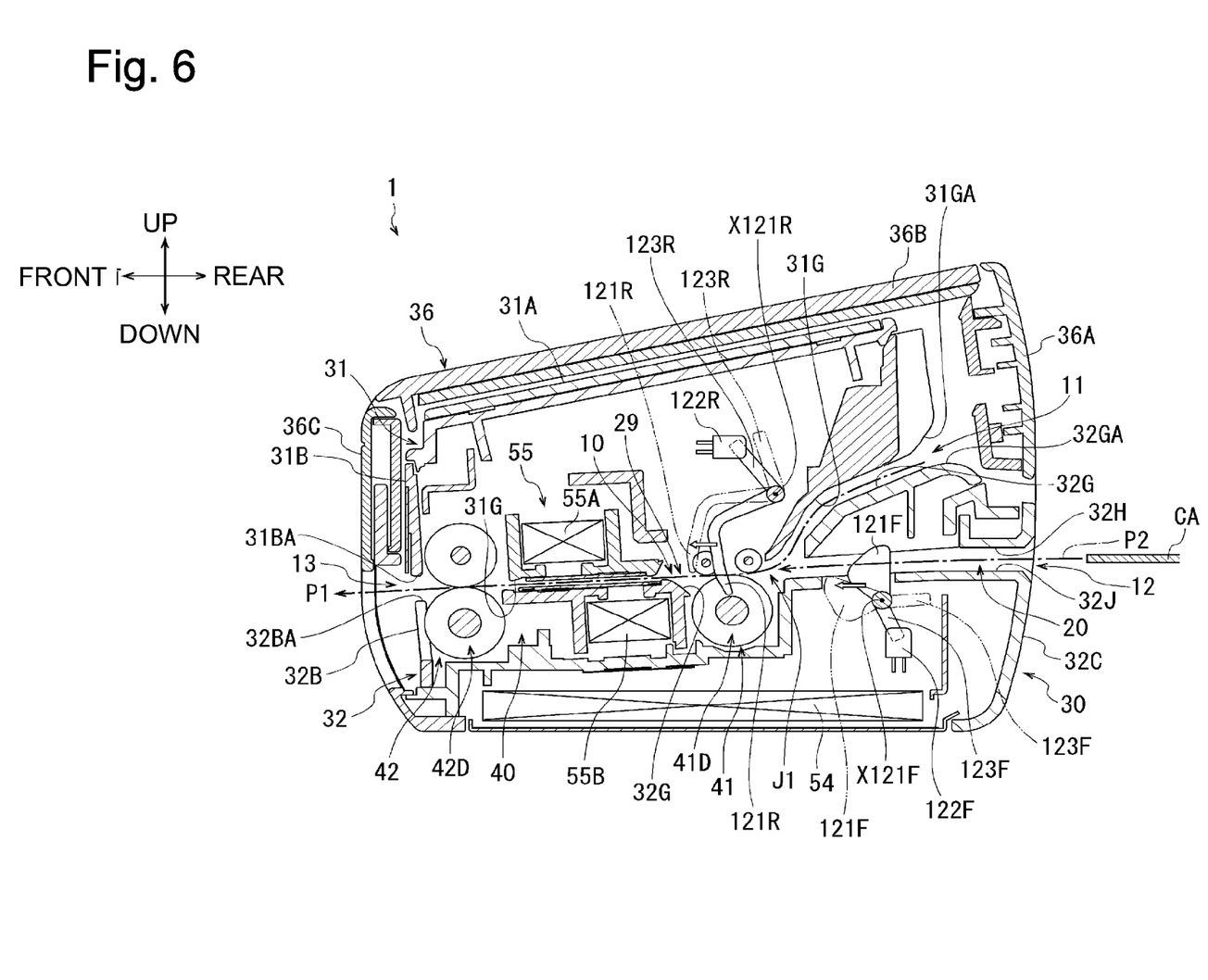
FIG. 6 is a sectional view of the image reading apparatus, taken along the line B-B in FIG. 4.
Figure 7:
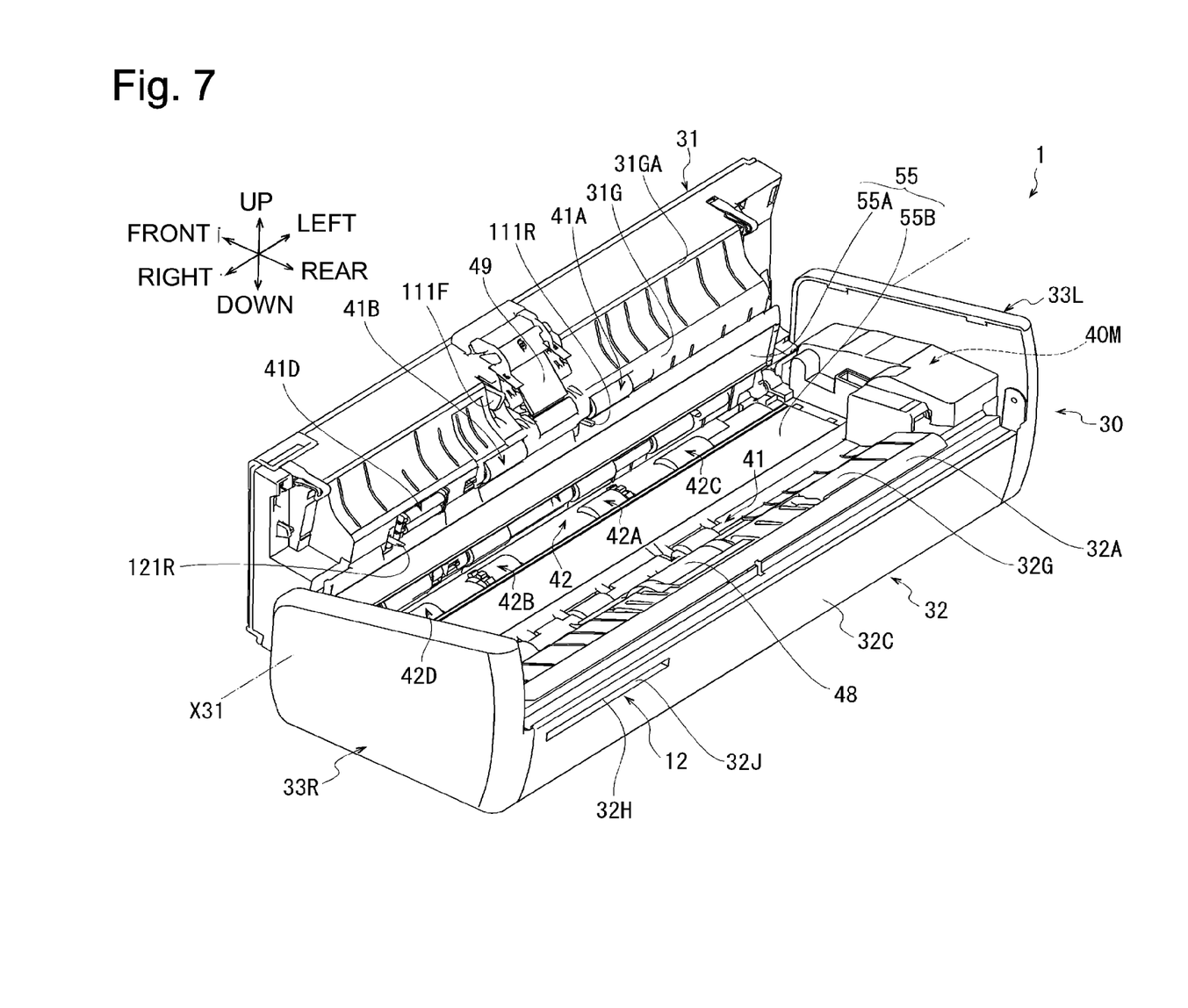
FIG. 7 is a perspective view of the image reading apparatus in which a first chute member is pivotally moved.

As depicted in FIGS. 1 and 5-7, the first chute member 31 may comprise an upper surface 31A, a front surface 31B, and an upper guide surface 31G. The upper surface 31A may comprise a flat surface facing upward. The upper surface 31A may slantingly extend forwardly and downwardly from its rear side in a slanted manner. A touch panel 70 may be disposed at a central portion of the upper surface 31A. The front surface 31B may comprise a flat surface facing forward. The front surface 31B may extend vertically downward from the front end of the upper surface 31A to a lower end 31BA. As depicted in FIGS. 5-7, the upper guide surface 31G may comprise a curved surface disposed on a rear portion thereof and a flat surface disposed on a front portion thereof. The curved surface, e.g., an inclined portion, of the upper guide surface 31G may extend forwardly and downwardly from a rear end 31GA thereof, e.g., the rear end of the lower side of the upper surface 31A, in a slanted manner. The flat surface, e.g., a horizontal portion, of the upper guide surface 31G may extend forwardly from a central portion of the first chute member 31 in the front-rear direction to the lower end 31BA of the front surface 31B. In one example, the first chute member 31 may extend forwardly and downwardly from its rear side in a slanted manner.

As depicted in FIGS. 1, 2 and FIGS. 5-7, the second chute member 32 may comprise a front surface 32B, a lower guide surface 32G and a rear surface 32C. The front surface 32B may comprise a flat surface facing forward. The front surface 32B may comprise an upper end 32BA. The upper end 32BA may be positioned below the lower end 31BA of the front surface 31B with a distance therebetween. The front surface 32B may extend vertically downward from the upper end 32BA. As depicted in FIGS. 5-7, the lower guide surface 32G may comprise a curved surface disposed on a rear portion thereof. The curved surface, e.g., an inclined portion, of the lower guide surface 32G may extend forward and downward from a rear end 32GA thereof, e.g., the upper end of the rear surface 32C, in a slanted manner along the inclined portion of the upper guide surface 31G. A horizontal portion of the lower guide surface 32G may extend forward from a central portion of the second chute member 32 in the front-rear direction to the upper end 32BA of the front surface 32B. The rear surface 32C may comprise a flat surface facing rearward. The rear surface 32C may extend downward from its upper end in a generally vertical direction.

Figure 8:
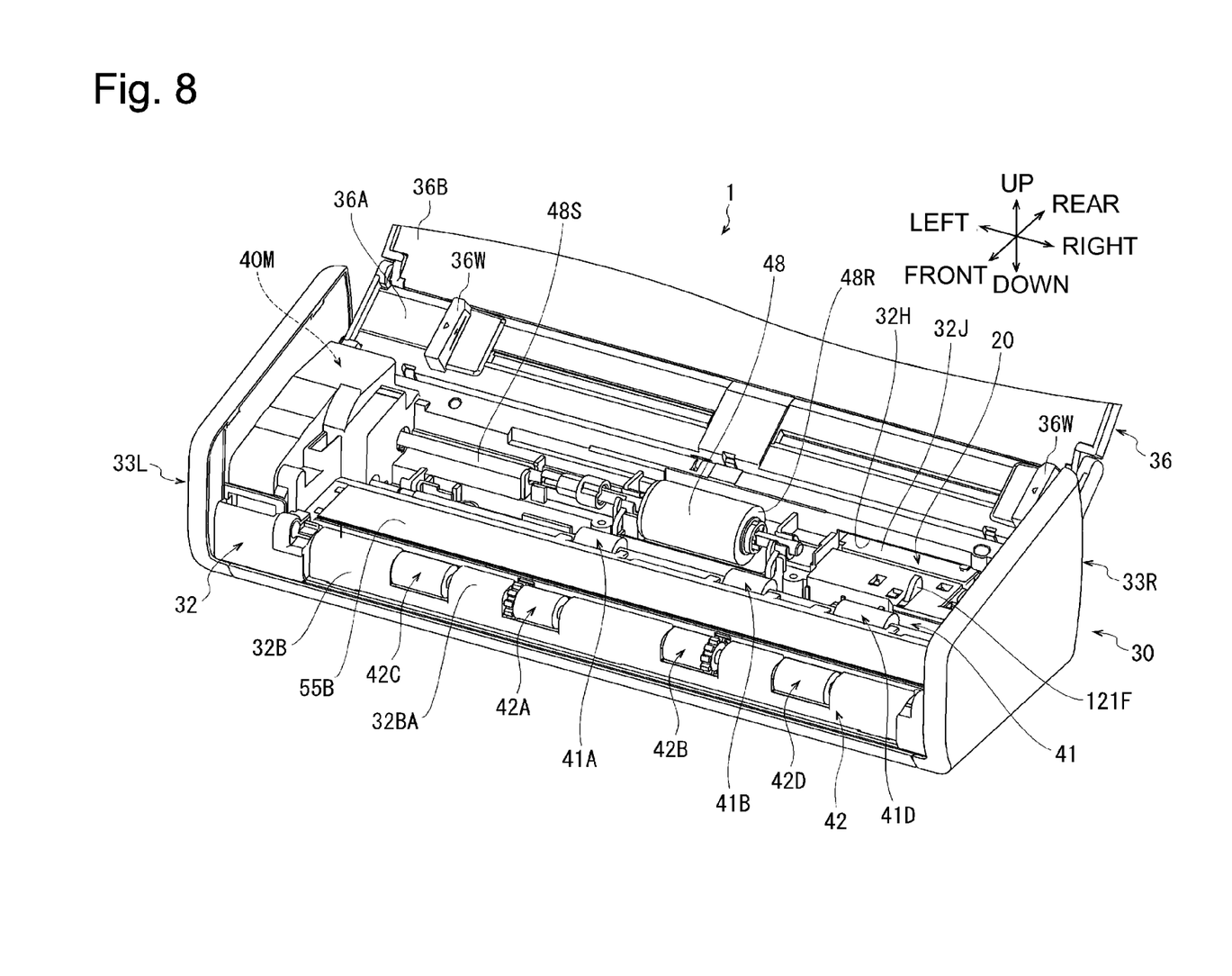
FIG. 8 is a perspective view of the image reading apparatus showing a separation roller and a drive shaft.

As depicted in FIGS. 6 and 8, the second chute member 32 may comprise a lower card guide surface 32J and an upper card guide surface 32H. The lower card guide surface 32J may extend horizontally rearward to the rear surface 32C from a right end in FIG. 6, e.g., the rear end, of the horizontal portion of the lower guide surface 32G. The upper card guide surface 32H may be positioned above the lower card guide surface 32J with a distance therebetween. The upper card guide surface 32H may extend horizontally rearward from the right end in FIG. 6, e.g., the rear end, of the horizontal portion of the upper guide surface 31G to the rear surface 32C in parallel with the lower card guide surface 32J. As depicted in FIG. 6, the height or level of the upper card guide surface 32H in the vertical direction may be the same as the height or level of the horizontal portion of the upper guide surface 31G in the vertical direction.

The upper guide surface 31G, the lower guide surface 32G, the upper card guide surface 32H, and the lower card guide surface 32J might not be limited to a smooth continuous surface, but may be constituted by, for example, tips of ribs or protrusions.

Figure 4:
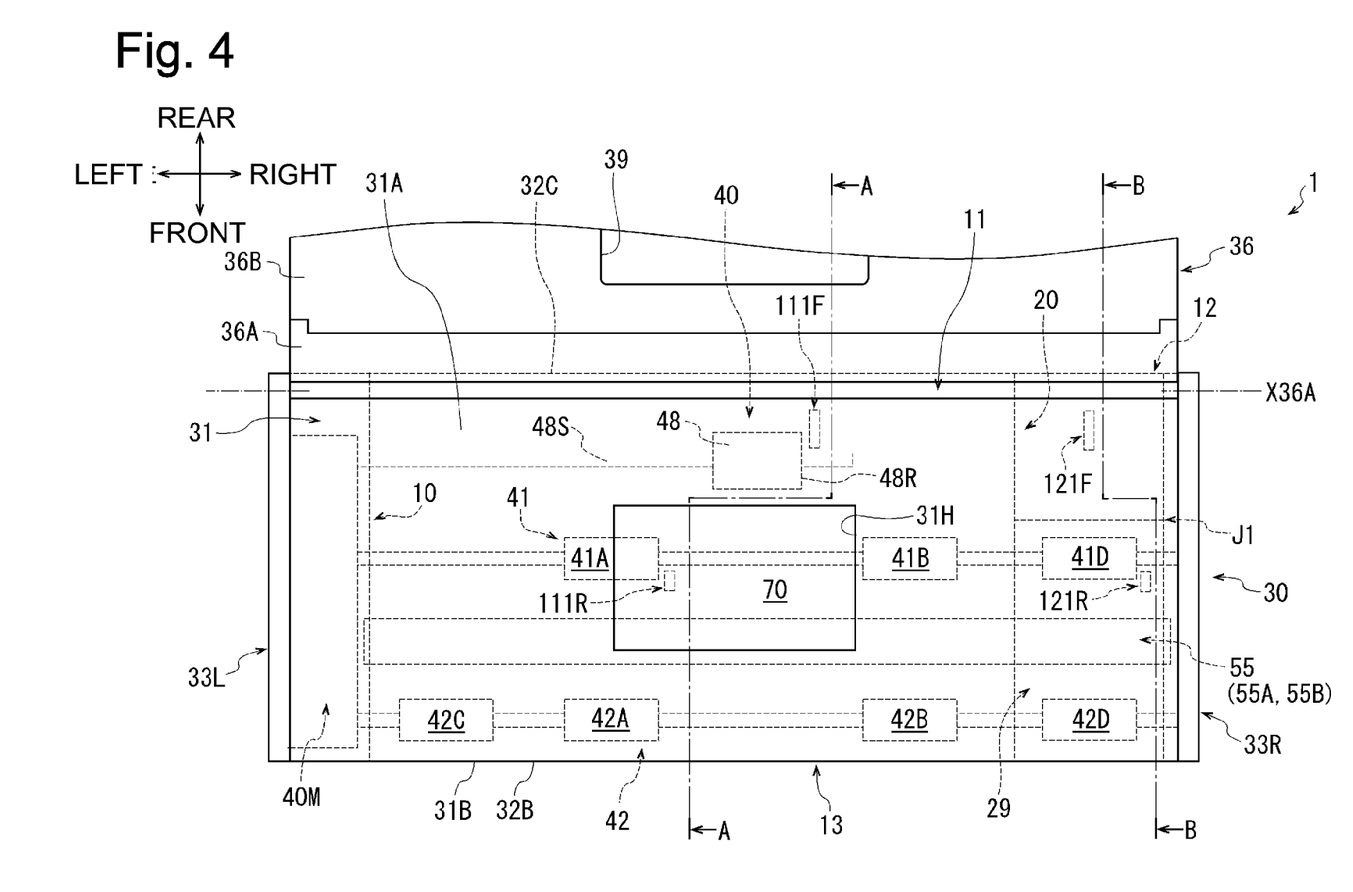
FIG. 4 is a diagrammatic top view of the image reading apparatus in which the sheet tray is open.

As depicted in FIGS. 4 and 6, a junction J1 may be disposed at a position where the lower card guide surface 32J may extend to the right end in FIG. 6, e.g., the rear end, of the horizontal portion of the lower guide surface 32G.

As depicted in FIGS. 1 and 5, the housing 30 may have a first introduction opening 11 and a discharge opening 13.

One or more sheets SH may be inserted into the first introduction opening 11. The sheet SH may comprise, for example, a sheet of paper or an overhead projector (OHP) sheet. The sheet SH may be an example of a medium.

In one example, as depicted in FIG. 5, the first introduction opening 11 may be defined between the first chute member 31 and the second chute member 32. The first introduction opening 11 may be may be defined by a space between the rear edge 31GA of the upper guide surface 31G and the rear edge 32GA of the lower guide surface 32G. As depicted in FIG. 1, the first introduction opening 11 may extend in the left-right direction from a portion near the left side frame 33L to a portion near the right side frame 33R. In one example, the length of the first introduction opening 11 in the left-right direction may be longer than the width of the sheet SH.

As depicted in FIGS. 1 and 5, the sheet SH may be discharged from the discharge opening 13. The discharge opening 13 may be defined between the first chute member 31 and the second chute member 32. For example, the discharge opening 13 may be defined by a space between the lower end 31BA of the front surface 31B and the upper end 32BA of the front surface 32B. The discharge opening 13 may extend in the left-right direction from a portion near the left side frame 33L to a portion near the right side frame 33R. In one example, the length of the discharge opening 13 in the left-right direction may be longer than the width of the sheet SH, similar to the first introduction opening 11.

As depicted in FIGS. 4-6, the image reading apparatus 1 may comprise a first guide portion 10. The first guide portion 10 may comprise the first chute member 31 and the second chute member 32. The first guide portion 10 may comprise a first conveyance path P1 that may be defined between the upper guide surface 31G of the first chute member 31 and the lower guide surface 32G of the second chute member 32 in the vertical direction. The first guide portion 10 may be configured to guide the sheet SH from the first introduction opening 11 to the discharge opening 13 along the first conveyance path P1.

A portion of the first guide portion 10 may extend frontward and downward from the first introduction opening 11 in a slanted manner. One or more other portions of the first guide portion 10 may extend horizontally forward from a central portion of the housing 30 in the front-rear direction to the discharge opening 13.

As depicted in FIG. 7, the first chute member 31 may be pivotally attached to the housing 30 about a rotation axis X31. The rotation axis X31 may extend in the left-right direction at the lower end 31BA of the front surface 31B of the first chute member 31. As the first chute member 31 pivotally moves to separate from the second chute member 32 in an upward direction, the first guide portion 10 may open.

As depicted in FIG. 4, a portion of the first guide portion 10 on the right side and on the discharge opening 13 side with respect to the junction J1 may correspond to a card conveyance area 29.

Figure 2:
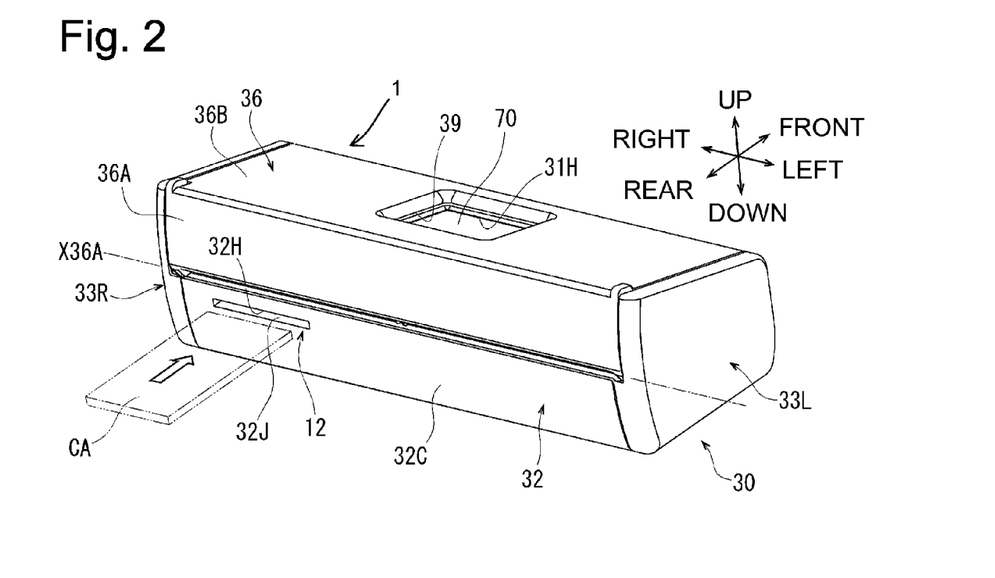
FIG. 2 is a rear perspective view of the image reading apparatus in which the sheet tray is closed.

As depicted in FIGS. 2 and 6, the housing 30 may have a second introduction opening 12. A card CA having a width smaller than that of the sheet SH may be inserted into the second introduction opening 12. The card CA may be a medium having an area smaller than that of the sheet SH. The card CA may be, for example, a business card, an ATM card, a membership card, a license card. The card CA may be, for example, a business card, an ATM card, a membership card, and a license card. In one example, the length of the shorter side, e.g., width, and length of the longer side of the card CA may be, for example, 53.98 mm and 85.60 mm, respectively, of an ID-1 format card whose size is specified by International Organization for Standardization (ISO)/International Electrotechnical Commission (IEC). The card CA may be thicker and more rigid than the sheet SH.

According to one or more arrangements, the second introduction opening 12 may be provided in the second chute member 32, as depicted in FIG. 6. The second introduction opening 12 may be disposed at a portion of the rear surface 32C on the side of the right side frame 33R. The second introduction opening 12 may extend in the left-right direction. The length of the second introduction opening 12 in the left-right direction may be shorter than the length of the first introduction opening 11 in the left-right direction. In one example, the length of the second introduction opening 12 in the left-right direction may be longer than the width of the card CA, e.g., 85.60 mm. The height of the second introduction opening 12 in the vertical direction may be the same as the height of the horizontal portion of the first guide portion 10 and the discharge opening 13 in the vertical direction. The second introduction opening 12 may be disposed below a right end portion of the first introduction opening 11 in the vertical direction.

The left-right direction of the image reading apparatus 1 may be an example of a width direction. In the example embodiment, one end and an opposite end in the width direction may be examples of a right end and a left end, respectively.

Figure 3:
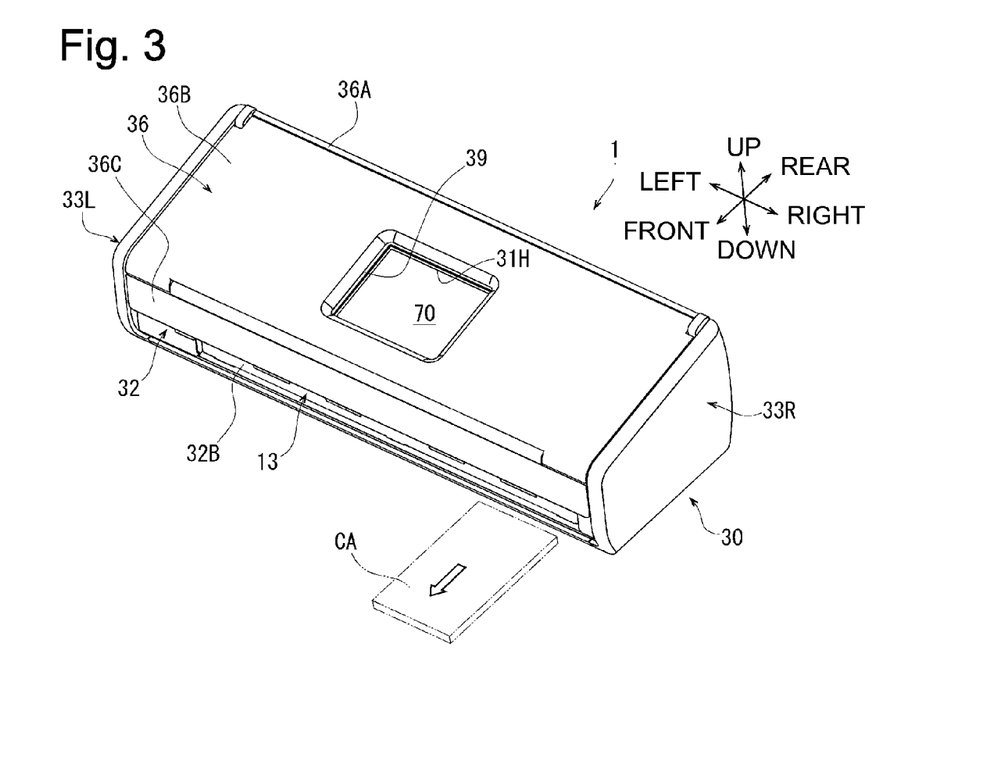
FIG. 3 is a front perspective view of the image reading apparatus in which the sheet tray is closed.

As depicted in FIGS. 3 and 6, the card CA may be discharged from a right end portion of the discharge opening 13. For example, the discharge opening 13 may be shared to discharge the sheet SH inserted through the first introduction opening 11 and the card CA inserted through the second introduction opening 12.

As depicted in FIGS. 4, 6 and 8, the image reading apparatus 1 may comprise a second guide portion 20. The second guide portion 20 may comprise a second conveyance path P2 that may be defined between the upper card guide surface 32H of the second chute member 32 and the lower card guide surface 32J in vertical direction, as depicted in FIG. 6. The second guide portion 20 may extend frontward from the second introduction opening 12 and may join the first guide portion 10 at the junction J1. The second guide portion 20 may be configured to guide the card CA inserted through the second introduction opening 12 along the second conveyance path P2, to the first guide portion 10.

The junction J1 may be disposed between the inclined portion and the horizontal portion of the upper guide surface 31G. Thus, the second guide portion 20 and a right side portion of the first guide portion 10 where the card conveyance area 29 may be disposed, may define a path extending horizontally from the second introduction opening 12 disposed on the rear side of the image reading apparatus 1 to the right end portion of the discharge opening 13 disposed on the front side of the image reading apparatus 1. The card CA may be guided from the second introduction opening 12 to the right side portion of the discharge opening 13 along the path.

As depicted in FIG. 1, the sheet tray 36 may comprise a base portion 36A, a central portion 36B and a tip portion 36C. The base portion 36A may be pivotally supported by the side frames 33L and 33R about a rotation axis X36A extending along the left-right direction. The central portion 36B may be connected to an end of the base portion 36A further from the rotation axis X36A. The tip portion 36C may be connected to an end of the central portion 36B further from the base portion 36A. The central portion 36B may have an opening 39 of a rectangular shape at a central portion thereof.

When the sheet tray 36 is open as depicted in FIGS. 1 and 5, the base portion 36A, the central portion 36B and the tip portion 36C may extend upward and rearward so as to continue to the inclined portion of the lower guide surface 32G. When the sheet tray 36 is opened, the first introduction opening 11 may open. One or more sheets SH may be placed on the sheet tray 36. The sheet tray 36 may comprise a pair of left and right width regulation guides 36W. The width regulation guides 36W may be configured to interpose one or more sheets SH placed on the sheet tray 36 therebetween in the left-right direction, to position the sheets SH on the sheet tray 36 with respect to the left-right direction. The sheets SH placed on the sheet tray 36 may be inserted into the first introduction opening 11 and be guided to the discharge opening 13 by the first guide portion 10.

When the sheet tray 36 is closed as depicted in FIGS. 2, 3 and 6, the base portion 36A may extend vertically and be flush with the rear surface 32C of the second chute member 32. The central portion 36B may cover the upper surface 31A of the first chute member 31 from above. The tip portion 36C may cover the front surface 31B of the first chute member 31 from the front side of the front surface 31B. As depicted in FIGS. 2 and 3, the opening 39 may allow the touch panel 70 to be exposed outside the image reading apparatus 1 when the sheet tray 36 is closed.

As depicted in FIGS. 4-6, the image reading apparatus 1 may comprise a control board 54, a drive source 40M, a conveyor 40 and a reader 55.

As depicted in FIGS. 5 and 6, the control board 54 may be disposed at a bottom portion of the second chute member 32. The control board 54 may be a flat-shaped electronic circuit board comprising a central processing unit (CPU), a read-only memory (ROM), and a random-access memory ("RAM"). Power may be supplied to the control board 54 from a home electric outlet, via an AC adapter and a power supply cord. The control board 54 may be electrically connected to, for example, the drive source 40M, the reader 55, and the touch panel 70.

As depicted in FIG. 4, the drive source 40M may be disposed in the housing 30 at the left side frame 33L. The drive source 40M may comprise a motor and transmission gears. The drive source 40M may be configured to generate the drive force while the motor is controlled by the control board 54.

As depicted in FIGS. 4-8, the conveyor 40 may comprise a separation roller 48, a drive shaft 48S, a separation pad 49, an upstream-side conveyor portion 41, and a downstream-side conveyor portion 42. The reader 55 may comprise a first reader 55A and a second reader 55B. In the first guide portion 10, the separation roller 48 and the separation pad 49 may be followed by the upstream-side conveyor portion 41, the second reader 55B, the first reader 55A, and the downstream-side conveyor portion 42 that may be arranged in this order from the upstream side to the downstream side in a conveyance direction. The sheet SH and the card CA may be conveyed in the conveyance direction from the first introduction opening 11 and the second introduction opening 12, respectively, toward the discharge opening 13. The separation roller 48 and the separation pad 49 may be disposed on the first introduction opening 11 side with respect to the junction J1. The upstream-side conveyor portion 41, the second reader 55B, the first reader 55A and the downstream-side conveyor portion 42 may be disposed on the discharge opening 13 side with respect to the junction J1.

As depicted in FIGS. 5 and 8, the separation roller 48 may be rotatably supported in the second chute member 32. An upper portion of the separation roller 48 may be exposed from the inclined portion of the lower guide surface 32G toward the first guide portion 10.

As depicted in FIGS. 4 and 8, the separation roller 48 may be disposed at a central portion of the first guide portion 10 in the left-right direction. At least a part of the central portion of the first guide portion 10 in the left-right direction may be disposed on a left side of the card conveyance area 29. The separation roller 48 may be connected to the drive source 40M by the drive shaft 48S. The drive shaft 48S may be coaxial with the separation roller 48 and extend in the left-right direction. The right end of the drive shaft 48S may protrude rightward from a right end surface 48R of the separation roller 48. The drive shaft 48S may be rotatably supported by the second chute member 32. The right end of the drive shaft 48S may stop or be positioned at the left of the card conveyance area 29, e.g., on the left side with respect to the card conveyance area 29. The drive shaft 48S may be configured to transmit the drive force from the drive source 40M to the separation roller 48.

The separation roller 48 may be configured to be driven by the drive source 40M, via the drive shaft 48S. The control board 54 may be configured to control the drive source 40M. As depicted in FIG. 5, the separation roller 48 may be configured to rotate while making contact with the sheets SH placed on the sheet tray 36 to feed the sheets SH to the first guide portion 10.

As depicted in FIG. 7, the separation pad 49 may be disposed at the first chute member 31. As depicted in FIG. 5, the separation pad 49 may be exposed to the first guide portion 10 in the upper guide surface 31G. The separation pad 49 may comprise a friction member, e.g., rubber and elastomer, having a plate shape. The separation pad 49 may be urged by an urging member (not depicted) so that the separation pad 49 may be pressed against the separation roller 48 when the first chute member 31 is closed. The separation roller 48 and the separation pad 49 may be configured to separate the sheets SH to be conveyed in the first guide portion 10 one by one while holding the sheets SH therebetween.

As depicted in FIGS. 4-8, the upstream-side conveyor portion 41 may comprise first conveyance roller pairs 42A and 42B and a second conveyance roller pair 41D. The first conveyance roller pairs 42A and 42B and the second conveyance roller pair 41D may be disposed in the horizontal portions of the upper guide surface 31G and the lower guide surface 32G at the same positions in the conveyance direction. Each of the first conveyance roller pairs 42A and 42B and the second conveyance roller pair 41D may comprise a drive roller configured to be rotated by the drive source 40M and a driven roller facing the drive roller in the vertical direction when the first chute member 31 is closed.

The first conveyance roller pairs 42A and 42B may be disposed outside the card conveyance area 29 in the left-right direction. The first conveyance roller pairs 42A and 42B may be configured to rotate while holding or nipping the sheet SH to convey the sheet SH in the first guide portion 10. The second conveyance roller pair 41D may be disposed at the card conveyance area 29. The second conveyance roller pair 41D may be configured to rotate while holding or nipping the card CA, to convey the card CA at the card conveyance area 29 in the first guide portion 10. As depicted in FIGS. 4 and 6, the second conveyance roller pair 41D may be disposed in front of the junction J1. For example, the junction J1 may be disposed between the separation roller 48 and the second conveyance roller pair 41D in the front-rear direction.

The second reader 55B may be attached to the second chute member 32. For example, the second reader 55B may comprise a contact image sensor ("CIS"), a CIS holder and a contact glass. The upper surface of the second reader 55B may be exposed to the first guide portion 10 at the horizontal portion of the lower guide surface 32G.

The first reader 55A may be attached to the first chute member 31. For example, the first reader 55A may comprise a contact image sensor ("CIS"), a CIS holder and a contact glass. The lower surface of the first reader 55A may be exposed to the first guide portion 10 at the horizontal portion of the upper guide surface 31G. The first reader 55A may be disposed closer to the discharge opening 13 than the second reader 55B.

In one or more examples, the first reader 55A and the second reader 55B may be disposed across an entire length of the first guide portion 10. The first reader 55A and the second reader 55B may be disposed opposite to each other in the vertical direction to interpose the first guide portion 10.

With the above-described structure, the first reader 55A and the second reader 55B may be configured to read an image on each side of the sheet SH when the sheet SH is conveyed in the first guide portion 10. The first reader 55A and the second reader 55B may also be configured to read an image on each side of the card CA when the card CA guided by the second guide portion 20 is conveyed in the card conveyance area 29.

The downstream-side conveyor portion 42 may comprise first conveyance roller pairs 42A, 42B, and 42C and a second conveyance roller pair 42D. The first conveyance roller pairs 42A, 42B, and 42C and the second conveyance roller pair 42D may be disposed in the horizontal portions of the upper guide surface 31G and the lower guide surface 32G at the same position in the conveyance direction. Each of the first conveyance roller pairs 42A, 42B, and 42C and the second conveyance roller pair 42D may comprise a drive roller configured to be rotated by the drive source 40M and a driven roller facing the drive roller in the vertical direction when the first chute member 31 is closed.

The first conveyance roller pairs 42A, 42B, and 42C may be disposed outside the card conveyance area 29 in the left-right direction. The first conveyance roller pairs 42A, 42B, and 42C may be configured to rotate while holding or nipping the sheet SH being conveyed in the first guide portion 10, to discharge the sheet SH outside the housing 30 through the discharge opening 13. The second conveyance roller pair 42D may be disposed at the card conveyance area 29. The second conveyance roller pair 42D may be configured to rotate while holding or nipping the card CA whose image has been read in the card conveyance area 29, to discharge the card CA outside the housing 30 through the right portion of the discharge opening 13.

As depicted in FIGS. 1 and 5, the touch panel 70 may be attached to an interior of the first chute member 31 on the upper surface 31A side. The touch panel 70 may be exposed outside the first chute member 31 through a rectangular-shaped touch panel opening 31H that may be provided in the upper surface 31A. The touch panel 70 may comprise a liquid crystal display panel, a light source, e.g., fluorescent lamp or a light-emitting diode (LED), configured to irradiate the liquid crystal display panel with light from the back side of the liquid crystal display panel, and a contact sensing film attached to a surface of the liquid crystal display panel.

The touch panel 70 may be configured to display an operational status of the image reading apparatus 1, e.g., a processing status of an image reading operation and errors, and various buttons, e.g., buttons to start an image reading operation and to make settings, under the control of the control board 54. The touch panel 70 may be configured to permit an external input. When a button displayed in the touch panel 70 is touched (e.g., selected) to perform an operation or setting corresponding to the button, the touch panel 70 may transmit a signal in response to the touch operation, to the control board 54.

As depicted in FIGS. 4, 5 and 7, the image reading apparatus 1 may comprise actuators 111F and 111R for the sheets SH. As depicted in FIG. 5, the image reading apparatus 1 may comprise photo-interrupters 112F and 112R for the sheets SH. The actuator 111F and the photo-interrupter 112F for the sheets SH may be an example of a first detection portion. The actuator 111R and the photo-interrupter 112R may be an example of the first detection portion. The actuators 111F and 111R may be an example of a first pivot member. The photo-interrupters 112F and 112R may be an example of a first sensor.

As depicted in FIGS. 4 and 5, the actuator 111F may be positioned in the first guide portion 10 upstream of the junction J1 in the conveyance direction. The actuator 111R may be positioned in the first guide portion 10 downstream of the junction J1 in the conveyance direction. As depicted in FIGS. 5 and 7, the actuators 111F and 111R may be disposed at the upper side of the first guide portion 10, e.g., the upper guide surface 31G.

As depicted in FIG. 5, the actuator 111F may be pivotally supported by the first chute member 31. More specifically, an upper end portion of the actuator 111F may be pivotally supported by the first chute member 31 about a rotation axis X111F extending along the left-right direction. The rotation axis X111F may be positioned above the separation roller 48. The actuator 111F may extend downward from the rotation axis X111F toward the separation roller 48. As depicted in FIGS. 4 and 5, a lower end portion of the actuator 111F may be positioned near the right end surface 48R of the separation roller 48. For example, the actuator 111F may be positioned at a generally central portion of the first guide portion 10 in the left-right direction.

As depicted in FIG. 5, a shield portion 113F, that may protrude forward from the rotation axis X111F, may be connected to the actuator 111F. The shield portion 113F may be configured to pivotally move in the vertical direction, together with the actuator 111F. When the sheet SH inserted from the first introduction opening 11 is held or nipped between the separation roller 48 and the separation pad 49, the actuator 111F may contact the sheet SH. Thus, the actuator 111F may be pushed by the sheet SH, as depicted by the alternate long and two short dashed line in FIG. 5, and may pivotally move clockwise (in the orientation shown in FIG. 5) toward the discharge opening 13.

The actuator 111R may be pivotally supported by the first chute member 31. For example, an upper end portion of the actuator 111R may be pivotally supported by the first chute member 31 about a rotation axis X111R extending along the left-right direction. The rotation axis X111R may be positioned above the first conveyance roller pair 41A. The actuator 111R may extend from the rotation axis X111R forwardly and bend downwardly toward a lower roller of the first conveyance roller pair 41A disposed in the second chute member 32. As depicted in FIGS. 4 and 5, a lower end portion of the actuator 111R may be positioned near the right end face of the lower roller of the first conveyance roller pair 41A. The actuator 111F may be positioned at a generally central portion of the first guide portion 10 in the left-right direction.

As depicted in FIG. 5, a shield portion 113R, that may protrude forward and upward from the rotation axis X111R, may be connected to the actuator 111R. The shield portion 113R may be configured to pivotally move in the front-rear direction (e.g., counterclockwise direction in the orientation shown in FIG. 5), together with the actuator 111R. When the sheet SH inserted through the first introduction opening 11 is held or nipped by the first conveyance roller pairs 41A and 41B, the actuator 111R may contact the sheet SH. Thus, the actuator 111R may be pushed by the sheet SH, as depicted by the alternate long and two short dashes line in FIG. 5, to pivotally move toward the discharge opening 13.

The photo-interrupter 112F may be disposed in the first chute member 31. The photo-interrupter 112F may comprise a light-emitting element and a light-receiving element. The photo-interrupter 112F may be configured to detect whether the actuator 111F is pivotally moved, based on whether the light-receiving element receives the light emitted from the light-emitting element. More specifically, the photo-interrupter 112F may detect that the actuator 111F is not pivotally moved, when the shield portion 113F blocks the emitted light. The photo-interrupter 112F may detect that the actuator 111F is pivotally moved, when the shield portion 113F moves in a clockwise direction (e.g., according to the orientation shown in FIG. 5) so as not to block the emitted light. The result of the detection by the photo-interrupter 112F may be transmitted to the control board 54.

The photo-interrupter 112R may be disposed in the first chute member 31. The photo-interrupter 112R may comprise a light-emitting element and a light-receiving element. The photo-interrupter 112R may be configured to detect whether the actuator 111R is pivotally moved, based on whether the light-receiving element receives the light emitted from the light-emitting element. More specifically, the photo-interrupter 112R may detect that the actuator 111R is not pivotally moved when the shield portion 113R blocks the emitted light. The photo-interrupter 112R may detect that the actuator 111R is pivotally moved, when the shield portion 113R moves in a clockwise direction (e.g., according to the orientation shown in FIG. 5) so as not to block the emitted light. The result of the detection by the photo-interrupter 112R may be transmitted to the control board 54.

As depicted in FIGS. 4 and 6-8, the image reading apparatus 1 may comprise actuators 121F, 121R for the card CA. As depicted in FIG. 6, the image reading apparatus 1 may comprise photo-interrupters 122F, 122R for the card CA. The actuator 121F and the photo-interrupter 122F may be an example of a second detection portion. The actuator 121F may be an example of a second pivot member. The photo-interrupter 122F may be an example of a second sensor.

As depicted in FIGS. 4 and 6, the actuator 121F may be positioned in the second guide portion 20. The actuator 121R may be positioned in the first guide portion 10 downstream of the junction J1 in the conveyance direction of the card CA. As depicted in FIGS. 4, the actuator 121R may be positioned in a right end portion of the first guide portion 10, e.g., the card conveyance area 29 in the left-right direction.

As depicted in FIG. 6, the actuator 121F may be pivotally supported by the second chute member 32. For example, a lower end portion of the actuator 121F may be pivotally supported by the second chute member 32 about a rotation axis X121F extending along the left-right direction. The rotation axis X121F may be positioned below the lower card guide surface 32J. The actuator 121F may extend upward from the rotation axis X121F, to intersect the second guide portion 20. A shield portion 123F that may protrude downward from the rotation axis X121F may be provided for the actuator 121F. The shield portion 123F may be configured to pivotally move in the vertical direction (e.g., rotationally), together with the actuator 121F. When the card CA inserted from the second introduction opening 12 passes the second guide portion 20, the actuator 121F may contact the card CA. Thus, the actuator 121F may be pushed by the card CA, as depicted by the alternate long and two short dashes line in FIG. 6, and may pivotally move toward the discharge opening 13.

The actuator 121R may be pivotally supported by the first chute member 31. For example, an upper end portion of the actuator 121R may be pivotally supported by the first chute member 31 about a rotation axis X121R extending along the left-right direction. The rotation axis X121R may be positioned above the second conveyance roller pair 41D. The actuator 121R may extend from the rotation axis X121R forwardly and bend downward toward a lower roller of the second conveyance roller pair 41D disposed in the second chute member 32. As depicted in FIGS. 4 and 6, a lower end portion of the actuator 121R may be positioned near the right end face of the lower roller of the second conveyance roller pair 41D. The actuator 121R may be positioned closer to the right end of the housing 30 than the actuator 111R for the sheet SH.

As depicted in FIG. 6, a shield portion 123R that may protrude forward and upward from the rotation axis X121R may be provided for the actuator 121R. The shield portion 123R may be configured to pivotally move in the front-rear direction, together with the actuator 121R. When the card CA inserted through the second introduction opening 12 is held or nipped by the second conveyance roller pair 41D, the actuator 121R may contact the card CA. Thus, the actuator 121R may be pushed by the card CA, as depicted by the alternate long and two short dashed line in FIG. 6, to pivotally move toward the discharge opening 13. When the sheet SH inserted through the first introduction opening 11 passes the second conveyance roller pair 41D, the actuator 121R may contact the sheet SH. Thus, the actuator 121R may be pushed by the sheet SH, as depicted by the alternate long and two short dashed line in FIG. 6, to pivotally move toward the discharge opening 13.

The photo-interrupter 122F may be disposed in the second chute member 32. The photo-interrupter 122F may comprise a light-emitting element and a light-receiving element. The photo-interrupter 122F may be configured to detect whether the actuator 121F is pivotally moved, based on whether the light-receiving element receives the light emitted from the light-emitting element. For example, the photo-interrupter 122F may detect that the actuator 121F is not pivotally moved, when the shield portion 123F blocks the emitted light. The photo-interrupter 122F may detect that the actuator 121F is pivotally moved when the shield portion 123F moves upward, as depicted by the alternate long and two short dashes line in FIG. 6, so as not to block the emitted light. The detection result of the photo-interrupter 122F may be transmitted to the control board 54.

The photo-interrupter 122R may be disposed in the first chute member 31. The photo-interrupter 122R may comprise a light-emitting element and a light-receiving element. The photo-interrupter 122R may be configured to detect whether the actuator 121R is pivotally moved, based on whether the light-receiving element receives the light emitted from the light-emitting element. More specifically, the photo-interrupter 122R may detect that the actuator 121R is not pivotally moved when the shield portion 123R blocks the emitted light. The photo-interrupter 122R may detect that the actuator 121R is pivotally moved when the shield portion 123R moves rearward, as depicted by the alternate long and two short dashes line in FIG. 6, so as not to block the emitted light. The result of the detection by the photo-interrupter 122R may be transmitted to the control board 54.

The image reading apparatus 1 may be configured to read an image on the sheet SH and the card CA.

When an image on the sheet SH is read, the sheet tray 36 may be open, as depicted in FIGS. 1 and 5. One or more sheets SH may be placed on the sheet tray 36. When the control board 54 receives an instruction to read an image on the sheet SH from the touch panel 70, the control board 54 may refer to the detection result of the photo-interrupter 112F. When the photo-interrupter 112F detect that the actuator 111F is pivotally moved, the control board 54 may determine that at least one sheet SH placed on the sheet tray 36 is held or nipped between the separation roller 48 and the separation pad 49, and may start the operation of reading an image on the sheet SH.

The control board 54 may send an instruction to generate the drive force to the drive source 40M. In response to the instruction, the separation roller 48 may be first rotated while holding the sheet SH together with the separation pad 49. The separation roller 48 may introduce the sheet SH placed on the sheet tray 36 through the first introduction opening 11 and feed the sheet SH to the first guide portion 10. At this time, the sheets SH may be separated one by one due to frictional force between the separation pad 49 and the sheet SH.

Thereafter, the first conveyance roller pairs 41A and 41B of the upstream-side conveyor portion 41 may convey the sheet SH fed by the separation roller 48 in the first guide portion 10. The first reader 55A and the second reader 55B may be read an image on each side of the sheet SH being conveyed in the first guide portion 10. At this time, to control the start timing of image reading by the first reader 55A and the second reader 55B, the control board 54 may refer to the detection result of the photo-interrupter 112R. The control board 54 may determine whether the sheet SH is held or nipped by the first conveyance roller pairs 41A and 41B, based on the detection result that the photo-interrupter 112R detects that the actuator 111R is pivotally moved. Thus, the control board 54 may control the start timing of an image reading by the first reader 55A and the second reader 55B. The first conveyance roller pairs 42A, 42B, and 42C of the downstream-side conveyor portion 42 may discharge the sheet SH whose image has been read, outside the housing 30 through the discharge opening 13.

When an image on the card CA is read, the sheet tray 36 may be closed, as depicted in FIGS. 2, 3 and 6. When the sheet tray 36 is closed, the card CA may be inserted into the second introduction opening 12 from the rear side of the housing 30, as depicted in FIG. 2. Thereafter, the card CA may pass through the second guide portion 20. The leading end of the card CA may reach the card conveyance area 29. When the control board 54 receives an instruction to read an image on the card CA from the touch panel 70, the control board 54 may refer to the detection result of the photo-interrupter 122F. When the photo-interrupter 122F detects that the actuator 121F is pivotally moved, the control board 54 may determine that the card CA inserted from the second introduction opening 12 passes the second guide portion 20, and the leading end of the card CA reaches the card conveyance area 29. The control board 54 may start the operation of reading an image on the card CA.

The control board 54 may be configured to send an instruction to generate the drive force to the drive source 40M. The second conveyance roller pair 41D of the upstream-side conveyor portion 41 may convey the card CA in the card conveyance area 29. The first reader 55A and the second reader 55B may read an image on each side of the card CA being conveyed in the card conveyance area 29. At this time, to control the start timing of an image reading by the first reader 55A and the second reader 55B, the control board 54 may refer to the detection result of the photo-interrupter 122R. The control board 54 may determine whether the card CA is held or nipped by the second conveyance roller pair 41D, based on the detection result that the photo-interrupter 122R detects that the actuator 121R is pivotally moved. Thus, the control board 54 may control the start timing of image reading by the first reader 55A and the second reader 55B. As depicted in FIG. 3, the second conveyance roller pair 42D of the downstream-side conveyor portion 42 may discharge the card CA whose image has been read, outside the housing 30 through the discharge opening 13.

In the image reading apparatus 1, the actuator 111F and the photo-interrupter 112F for the sheets SH may be employed as the first detection portion. In the image reading apparatus 1, the actuator 111R and the photo-interrupter 112R may also be employed as the first detection portion. Further, in the image reading apparatus 1, the actuator 121F and the photo-interrupter 122F may be employed as the second detection portion. Thus, manufacturing costs may be reduced in the image reading apparatus 1, as compared with a case in which, for example, a reflective optical sensor is employed as the first detection portion and the second detection portion.

Further, in the image reading apparatus 1, as depicted in FIG. 4, the separation roller 48 may be disposed at a central portion of the housing 30 in the left-right direction. The drive shaft 48S that may be coaxially disposed with the separation roller 48 may be configured to transmit the drive force from the drive source 40M that may be disposed on the left end portion of the housing 30, to the separation roller 48. In the image reading apparatus 1, an available space may be provided in the right side of the housing 30 because the right end of the drive shaft 48S may stop or be positioned near the right end surface 48R of the separation roller 48. Therefore, the second guide portion 20, the actuator 121F and the photo-interrupter 122F may be readily arranged in the available space. Consequently, the reduction in the size of the image reading apparatus 1 may be realized.

While the disclosure has been described in detail with reference to the specific embodiment thereof, this is merely an example, and various changes, arrangements and modifications may be applied therein without departing from the spirit and scope of the disclosure.

For example, the first detection portion and the second detection portion may be configured to detect a medium in a noncontact manner, e.g., optically or sonically. The first detection portion and the second detection portion may comprise a microswitch configured to switch on or off by contacting a medium.

What is claimed is:

1. An image reading apparatus comprising:
a housing having:
a first introduction opening;
a second introduction opening; and
a discharge opening,
wherein the housing defines a first conveyance path connecting the first introduction opening and the discharge opening, and
wherein the housing further defines a second conveyance path connecting the second introduction opening and a junction between the first conveyance path and the second conveyance path, wherein the second conveyance path is below at least a portion of the first conveyance path;
a reader configured to read an image of a medium received through at least one of the first introduction opening and the second introduction opening;
a first detection portion comprising:
a first pivot member configured to extend into the at least a portion of the first conveyance path and to pivot toward the discharge opening; and
a first sensor configured to detect pivotal movement of the first pivot member; and
a second detection portion comprising:
a second pivot member disposed below the second conveyance path and configured to extend into the second conveyance path and to pivotal toward the discharge opening; and
a second sensor configured to detect pivotal movement of the second pivot member.

2. The image reading apparatus according to claim 1, wherein the housing comprises:
a first chute member extending to the discharge opening and defining an upper boundary of the first conveyance path; and
a second chute member disposed below the first chute member and defining a lower boundary of the first conveyance path, and wherein
the first detection portion is disposed in the first chute member.

3. The image reading apparatus according to claim 2, wherein:
the second chute member comprises:
a first surface; and
a second surface disposed below the first surface, the first and second surfaces defining the second conveyance path, and
the second pivot member extends through the second surface.

4. The image reading apparatus according to claim 2, wherein:
the second introduction opening has a smaller width than the first introduction opening,
the housing defines the second introduction opening at one end of the second chute member in a width direction,
the second conveyance path is defined at the one end of the second chute member, and
the first detection portion is disposed at a central portion of the first chute member in the width direction.

5. The image reading apparatus according to claim 4, further comprising:
a separation roller disposed at a central portion of the housing in the width direction;
a motor disposed at an opposite end of the housing in the width direction and configured to generate a drive force, the opposite end being opposite to the one end in the width direction; and
a drive shaft disposed coaxially with the separation roller and configured to transmit the drive force from the motor to the separation roller, a length of a portion the drive shaft extending between the separation roller and the motor being greater than a length of a portion of the drive shaft extending between the separation roller and the one end in the width direction.

6. The image reading apparatus according to claim 5, wherein
the first detection portion abuts one end surface of the separation roller, the one end surface being a surface of the separation roller at the one end in the width direction.

7. The image reading apparatus according to claim 4, further comprising:
a third detection portion comprising:
a third pivot member disposed between the second introduction opening and the discharge opening in the first chute member, the third pivot member being pivotally movable toward the discharge opening; and
a third sensor configured to detect pivotal movement of the third pivot member.

8. The image reading apparatus according to claim 7, wherein
the third detection portion is disposed closer to a discharge opening side of the housing than to the junction.

9. The image reading apparatus according to claim 8, wherein
the third detection portion is disposed at the one end of the first chute member in the width direction.

10. An image reading apparatus comprising:
a first chute member having a first surface;
a second chute member disposed below the first chute member, the second chute member having a second surface facing and spaced apart from the first surface, the first and second surfaces defining a first conveyance path therebetween, the second chute member defining an introduction opening, the second chute member being configured to support the first chute member rotatably about a rotation axis;
a reader configured to read an image of a medium received through the introduction opening; a first detection portion comprising:
a first pivot member extending through at least one of the first surface and the second surface and configured to pivotally move toward the discharge opening; and
a first sensor configured to detect pivotal movement of the first pivot member; and
a second detection portion comprising:
a second pivot member extending through a third surface, the third surface defining a lower boundary of a second conveyance path extending from the introduction opening defined by the second chute member, wherein the second pivot member is configured to pivotally move toward the discharge opening; and
a second sensor configured to detect pivotal movement of the second pivot member.

11. The image reading apparatus of claim 10, wherein the third surface is disposed below the first and second surfaces.

12. The image reading apparatus according to claim 10, wherein the first pivot member extends from the first surface of the first chute member.

13. The image reading apparatus according to claim 10, wherein:
the second chute member defines the introduction opening at one end of the second chute member in a width direction,
the second conveyance path is defined at the one end of the second chute member, and
the first detection portion extends from a central portion of the first surface of the first chute member in the width direction.

14. The image reading apparatus according to claim 13, further comprising:
a separation roller extends from a central portion of the second surface of the second chute member in the width direction;
a motor disposed at an opposite end of the second chute member in the width direction and configured to generate a drive force, the opposite end being opposite to the one end in the width direction; and
a drive shaft disposed coaxially with the separation roller and configured to transmit the drive force from the motor to the separation roller, a length of a portion the drive shaft extending between the separation roller and the motor being greater than a length of a portion of the drive shaft extending between the separation roller and the one end in the width direction.

15. An image reading apparatus comprising:
a first chute member having a first surface;
a second chute member disposed below the first chute member, the second chute member having a second surface facing and spaced apart from the first surface, the second chute member having a third surface and a fourth surface facing and spaced apart from the third surface, the second chute member being configured to support the first chute member rotatably about a rotation axis and to receive a medium between the third and fourth surfaces;
a reader configured to read an image on the medium;
a first detection portion comprising:
a first pivot member extends through at least one of the first surface and the second surface and configured to pivotally move toward the rotation axis; and
a first sensor configured to detect pivotal movement of the first pivot member; and
a second detection portion comprising:
a second pivot member extends through the fourth surface of the second chute member, the fourth surface being disposed below the third surface, the second pivot member being pivotally movable toward the rotation axis; and
a second sensor configured to detect pivotal movement of the second pivot member.

16. The image reading apparatus of claim 15, wherein the third surface is disposed below the first and second surfaces.

17. The image reading apparatus according to claim 15, wherein the first pivot member extends from the first surface of the first chute member.

18. The image reading apparatus according to claim 15, wherein:
the second chute member has the third surface and the fourth surface at one end of the second chute member in a width direction, and
the first detection portion extends from a central portion of the first surface of the first chute member in the width direction.

19. The image reading apparatus according to claim 18, further comprising:
a separation roller extends from a central portion of the second surface of the second chute member in the width direction;
a motor disposed at an opposite end of the second chute member in the width direction and configured to generate a drive force, the opposite end being opposite to the one end in the width direction; and
a drive shaft disposed coaxially with the separation roller and configured to transmit the drive force from the motor to the separation roller, a length of a portion the drive shaft extending between the separation roller and the motor being greater than a length of a portion of the drive shaft extending between the separation roller and the one end in the width direction.

* * * * *